United States Patent [19]

Hamunen et al.

[11] Patent Number: 5,677,374
[45] Date of Patent: Oct. 14, 1997

[54] THICKENING AGENT COMPRISING AQUEOUS DISPERSION OF GRAFT-COPOLYMERIZED STARCH

[75] Inventors: Antti Hamunen, Raisio; Mika Anttila, Turku; Kari Nurmi, Raisio, all of Finland

[73] Assignee: Raisio Chemicals Oy, Raisio, Finland

[21] Appl. No.: 667,333

[22] Filed: Jun. 20, 1996

Related U.S. Application Data

[63] Continuation of Ser. No. 318,714, filed as PCT/FI93/00153, Apr. 8, 1993, published as WO93/21244, Oct. 28, 1993, abandoned.

[30] Foreign Application Priority Data

Apr. 16, 1992 [FI] Finland .................... 921752

[51] Int. Cl.$^6$ ................... C08L 77/00; B01J 13/00
[52] U.S. Cl. ................... 524/602; 524/609; 524/612; 524/916; 252/312
[58] Field of Search ................... 524/602, 609, 524/612, 916; 252/312

[56] References Cited

U.S. PATENT DOCUMENTS

| | | |
|---|---|---|
| 3,953,386 | 4/1976 | Murphy et al. |
| 4,134,863 | 1/1979 | Fanta et al. |
| 4,569,965 | 2/1986 | Engel et al. |
| 5,003,022 | 3/1991 | Nguyen et al. |
| 5,227,446 | 7/1993 | Denzinger et al. |

FOREIGN PATENT DOCUMENTS

| | | |
|---|---|---|
| 0 005 000 | 10/1979 | European Pat. Off. |
| 0334515 | 9/1989 | European Pat. Off. |
| 0356 241 | 2/1990 | European Pat. Off. |
| 0 441 197 | 8/1991 | European Pat. Off. |
| 0 499 578 | 8/1992 | European Pat. Off. |
| 0 408 099 | 5/1994 | European Pat. Off. |
| 58926 | 5/1981 | Finland . |
| 68633 | 10/1985 | Finland . |
| 74983 | 4/1988 | Finland . |

*Primary Examiner*—Kriellion S. Morgan
*Attorney, Agent, or Firm*—Armstrong, Westerman, Hattori, McLeland & Naughton

[57] ABSTRACT

The invention relates to a polymer dispersion, by means of which the rheological properties and structure of various liquid and flowing mixtures may be adjusted. The dispersion is prepared by radical polymerizing, into a water soluble chain backbone polymer or into such a polymer brought water soluble, in a water solution at least one $\alpha$-, $\beta$-unsaturated carboxyl acid containing 3–8 carbons as well as at least one to a limited amount unsaturated monomer. The chain backbone polymer is preferably a starch derivative.

5 Claims, No Drawings

THICKENING AGENT COMPRISING AQUEOUS DISPERSION OF GRAFT-COPOLYMERIZED STARCH

This application is a continuation of application Ser. No. 08/318,714 filed Oct. 12, 1994, now abandoned which is a continuation of PCT/FI93/00153 filed Apr. 8, 1993, published as WO93/21244, Oct. 28, 1993.

The present invention relates to a polymer dispersion, by means of which the rheological properties and structure of various liquid and flowing mixtures may be adjusted. Especially, the inventive dispersion is applicable to be used for improving the rheology and water retention of coating colours used in the preparation of coated paper grades, but the product is as well applicable to other analog objects, such as to the adjustment of the flowing properties of paints and colours.

The most important property of a good colour used in the coating of paper is the correct rheology. At low shearing speeds, the colour is to have a sufficiently high viscosity, so that the coating layer is not excessively absorbed into the paper and thus cause a spot-like coating result. At high shearing forces prevailing e.g. in connection with the coating occurrence below, the blade applying the coating colour onto the paper surface, the viscosity is to be low to make the coating occurring at high speeds initially possible. In other words, the colours are to be "shearing thinning" by nature. Another central property required by the coating colours—especially in connection with roll application—is water retention. If this property is omitted, the solids content of the colour in the coating process does not remain constant and the water retention into the base paper causes a spot-like coating result. In addition, the effective agents travelled along with the aqueous phase, such as optic brighteners, travel into the base paper or back to the colour circulation, due to which the coating result does not remain constant and the composition of the coating colour may change in the colour circulation.

For the adjustment of the colour rheology and water retention is generally used cellulose derivatives, such as carboxy methyl cellusose and hydroxy ethyl cellulose. By means of these, a relatively good result is generally achieved. A problem in connection therewith is a relatively complex prepation process and because of that a high price, and on the other hand the problems related to the treatment thereto. These chemicals are in fact delivered to the users as solid powders, whose solubility in water is very limited and slow. In addition to a cumbersome treatment, the water brought along with the dissolved cellulose derivative limits the selection of the colour components, when it is preferable to reach high-solids-content coating colours.

There are on the market also fully synthetic thickeners to be delivered in liquid form, which are generally prepared by polymerizing unsaturated, usually acrylate monomers into a polymer dispersion. However, their thickening properties do not correspond to cellulose derivatives, e.g. relative to the water retention. Also, the carrying capacity of optic brighteners is in this connection also lower. The preparation of acrylate dispersions of this type has been described as early as in 1958 in a patent specification U.S. Pat. No. 2,819,189 (Suen et al., American Cyanamide Company), in which patent a reference is also made to a possibility of using the product as a thickener. The U.S. Pat. No. 4,423,118 from the year 1983 (Corbett, Aschwanden, The Dow Chemical Company) describes the preparation and usage of a product polymerized from three acrylate monomers of a different type. The dispersion products prepared according to the patent are already at a fairly low solids content very viscous and thereby difficult to treat. The example 2 of said patent publication illustrates the limitations related to the usage of certain acrylic polymer dispersion compositions.

The inventive polymer dispersion offers a solution to the drawbacks mentioned above. It has now surprisingly been observed that by polymerizing suitable monomers into a polymer chain backbone, especially into a suitably treated starch, it is possible to achieve a low-viscosity dispersion product, whose thickening properties both for the rheology and the water retention, are ideal already at very low dosing levels. The advantages related to the usage of the dispersion prepared according to the invention thereby include easy utilization, good technical applicability, and due to small dosing quantities required, a better economicality than that prevailed earlier.

A central preparation technique of the inventive polymer dispersion is based on a grafting reaction, wherein into a chain backbone containing functional groups suitable from the point of view of the reaction, initialized by a radical reaction, are joined polymerizing monomers/monomer mixtures providing suitable properties. The term "dispersion" is to be understood in this connection widely, since at certain monomer/monomer chain backbone polymer ratios, the products are nearly totally or totally in the form of a solution.

In practise, groups achieving the radical initiation necessary from the point of view of the reaction, hydroxyl and amino groups are concerned. In this way, natural chain backbone materials are concerned, especially natural carbohydrates (e.g. starch, cellulose, alginates, etc.) proteins (e.g gelatin, collagen, gluten, casein, soybean protein, etc.), but also synthetic molecules, such as polyvinyl alcohol, polyaimides and polyacrylic amide are technically possible polymeric chain backbone molecules.

In addition to the functionality possibilitating the radical initiation, another property required of the chain backbone polymer is a correct molecular size and water solubility. Because of this, most compounds mentioned above are not as such suitable for chain backbone materials of grafting, but they have to be modified by splitting up or hydrolytically for reaching the correct state.

As especially advantageous chain backbone materials of grafting are considered to be starches of a different origin, since their availabity is good, they are very economical, their functionability in grafting reactions is excellent, as is well known, and their modification to a suitable solubility/molecular level is well controlled. Split-up starch modifications directly suitable for the preration of the inventive dispersion are commercially available, but the splitting up may be preferably performed also in situ as the first step of the preparation process by using an acidic or enzymatic hydrolysis or different oxidation methods. An especially preferable way of performing the necessary splitting-up reaction is thus an oxidation catalyzed by hydrogen peroxide, since the catalyst system used later also catalyzes the grafting reaction, and no extra components travel into the reaction mixture, which would require cleaning operations.

As is well known, the molecular size of polymers correlates with the viscosity of the polymer solution. In this way, the splitting-up degree suitable for the preparation of the dispersion may be controlled by means of viscosity measurements. It has been established that a practical viscosity level of the split-up starch solution, as measured from a 10%-solution at a temperature of 25° C. by means of a Brookfield RVTDV II viscosity meter, by means of a measuring head 2 and at a rate of 100 rpm immediately after the cooling of the starch solution is in the range of 10–200 mPas.

When using starch polymer providing a higher viscosity level, the grafting results in a dispersion product, whose viscosity is within an applicable range only at very dilute concentrations.

By using hydrogen peroxide, and a potate starch as raw material, a usable oxidation level is reached by a 35% hydrogen peroxide when a dosing of 1–10% as calculated on the amount of the dry starch is used. The splitting-up is preferably performed at a temperature of 25°–50° C. in a starch slurry, whose starch content is ca. 10–45%. A sufficient reaction time is thus ca. 2 hours. The oxidied starch to be obtained from the splitting-up process is in an insoluble granular form. For the further process, this product is to be brought water soluble by gelatinizing the product. This occurs by heating the slurry to a sufficiently high temperature. In practise, especially for the preparation of the inventive product, it is purposeful to perform the heating at 100° C. for at least 10–15 min for dissolving all the granules. It is generally most preferable to perform the gelatinization immediately in connection with the splitting-up process, but in several cases it is possible also after the radical polymerization.

An essential part of the preparation of the inventive dispersion is the grafting of monomers into the polymer chain backbone described above. Critical quantities for achieving an optimal functionability include the monomer composition, the amount of monomers in relation to the chain backbone material, the catalyst system achieving the radical initiation as well the reaction temperature.

Essential thickening properties are determined on the basis of the monomer composition used. It has been observed that as grafting monomers are to be used on one hand α-, β-ethylenically unsaturated carboxyl acids (A) and on the other hand more hydrophobic monomers, whose solubility in water is limited (B). As for the solubility, as the base value may be given a value such that the solubility should be below 20 g of the monomer in 100 g of the water solution. As examples of suitable unsaturated carboxyl acids are all unsaturated acids containg ca. 3–8 carbon atoms, but it is especially prerable to use an acrylic acid or a methacrylic acid. Suitable monomers having a limited solubility are e.g. acrylonitrile, vinyl asetate, methyl metacrylate, as well as ethyl and methyl acrylates. An especially suitable material for the preparation of the inventive dispersion is acrylonitrile. It is to be noted that varying amounts of other polymerizing monomers may also be used, such as styrene, acrylic amide, butyl acrylate, etc., but these do not provide a significant improvement in the thickener properties and when used in too large an amount, they are detrimental.

The mutual ratio of the monomers A and B is important both with respect to the external properties and to the thickening properties of the product. It has been observed that the molar ratio A/B may vary about in the limits 0.2–4.0 also depending on the chain backbone/monomer quantity ratio used. At too low A/B ratios, the stability of the dispersion is too weak, but on the other hand too high a ratio results in a high viscosity of the product and also in a disadvantageous water retention when used in coating colours. The A/B ratio to be used preferably varies within the limits 0.5–3 and most prerably within the limits 0.5–1.5.

The amount of the chain backbone material has an effect both on the external and functional properties of the product. When split-up starch is used as the chain backbone material, its amount may vary upwards from 1%. However, at low starch quantities, the grafting reaction becomes more difficult and at the same time, especially if the the A/B ratio is low, the stability of the product suffers. (A limiting case of an emulsion polymerization is concerned, wherein emulgators should be used for facilitating the provision of the product). A preferable quantity of starch is within a range of 10–70% of the total solid matter. It has been observed that an increase in the relative quantity of starch improves the water retention properties of the thickened product, but it weakens the viscosity stability of the dispersion itself, and after a certain optimal range also the ability of increasing the viscosity decreases. From the point of view of totality, the most preferable starch content is thus mostly within the range of 20–50% from the solid matter.

The monomers are joined to the chain backbone polymer by means of a radical polymerization reaction. In the case of the inventive type, the reaction is often termed as grafting. The reaction may be achieved by means of radical initiators known as such, which may be chemical (e.g. ammonium and potassium persulfhates, hydrogen peroxide, organic peroxides) or physical, such as by means of radiation by electron-, gamma- or UV-radiation. The reaction conditions as well as the functional properties of the product to be obtained naturally vary according to the initiation system to be used. For example, the grafting initiated by the radiation may be performed already at room temperature. Instead, the reaction as catalyzed by the peroxides and persulphates for reaching in practise a sufficient speed requires an elevated temperature of more than 40° C., but preferably more than 60° C. It has also been observed that the thickening effect of the product often significantly improves, when the temperature in the initial step of the reaction is first lower, e.g. within the range of 60°–70° C., and the temperature is finally increased to a higher level (>80° C.) e.g. for two hours.

When catalyzed by persulphates, the reaction may be performed in a normal atmosphere, whereas when catalyzed by hydrogen peroxide, the reaction requires a non-oxidizing atmosphere. Both from the point of view of the thickening ability and the external properties (low dispersion viscosity) of the product, an especially preferable initiation catalysis is obtained by means of hydrogen peroxide either alone or especially combined as an oxidation-reduction pair together with an organic compound having a multi-valued metal salt or an oxidation-reduction ability. Said suitable compounds to be used together with hydrogen peroxide include e.g. copper salts, iron salts (Fenton's reagent), ascorbic acid, hydroquinone, etc.

The dispersion product based on the inventive split-up starch may be manufactured up to about an 50% solids content, mainly depending on splitting-up degree and the monomer ratios of the starch. With respect to the thickener effect and viscosity stability of the dispersion, an optimal solids content is ca. 15–30% at a monomer ratio A/B of ca. 0.5–1.5. In this case, it is possible to obtain as a product a very easily treatable, low-viscosity (40–100 mPas) and stable dispersion, which provides for the colour in a pigment coating application ideal viscosity properties within a very extensive shearing speed range as well as an excellent water retention.

The pH-value of the dispersion prepared as described above is within the range of 1.8–5, the more acidic end of whose range describes a situation, in which the monomer ratio A/B is high and/or a catalyst system decreasing the pH-value as an initiator. The thickening effect of the product will be evident in an environment, whose pH-value is higher than the pH-value of the product itself. Because of this, it is apparent that the thickening effect is on one hand based on interactions, which prevail between ionized carboxyl groups and the more hydrophofic groups of the polymer, as well as on the adsorption between these groups and the particles (e.g. pigments) existing in the medium to be thickened.

The following examples illustrate in detail the preparation of the inventive thickening dispersion and its usage as a thickener of a pigment colour.

EXAMPLE 1

93.80 g of hypochlorite oxidized potate starch Raisamyl 302E, whose viscosity as a 10% water solution at 25° C. is 22 mPas, was elutriated into 900 g of water. The starch was gelatinized by admixing this slurry at an elevated temperature of 100° C. for 20 min, whereafter the temperature was decreased to 70° C. Into the solution was added 0.1 g of copper sulphate and a nitrogen elutriation was arranged into the reaction vessel for eliminating the oxygen. It was then simultaneously started to drop into the reaction mixture from dropping funnels a 35-% hydrogen peroxide (the total amount 5.2 g diluted into 60 ml of water) as well as a mixture, which contained 142 g of acrylic acid and 104 g of acrylonitrile (molar ratio 1.0). The monomer mixture was added totally within 1.5 hours and the catalyst within 3 hours. The reaction was allowed to continue for still 20 hours. As a product was obtained a white-like dispersion, whose solids content was 25.8%, pH-value 3.3, viscosity 54 mPas (25° C.) and the average particle size 490 nm. The product did not contain any precipitate. According to a gas chromatography analysis, the content of unreacted acrylonitrile contained by the product was 60 ppm and the amount of free acrylic acid was 0.05%.

EXAMPLE 2

The effect of the quantity ratios, the catalyst selection as well as the gelatinizing procedure of the starch derivative used as the chain backbody polymer, on the quality of the final product was clarified using the same reagents as in Example 1. The abbreviations used:

Catalyst: APS=ammonium persulphate, PER=$H_2O_2$—$CuSO_4$.

TMO: GEL=the starch is gelatinized before the radical reaction, GRA=the starch is gelatinized after the radical reaction.

AsN: molar ratio: acrylic acid/acrylonitrile.

SsSY: molar ratio: starch/synthetic monomer

% ST (starch), % AC (acrylic acid), % NIT (acrylonitrile): composition by percent.

Dry matter content (d.m.c.): the solids content-% of the product.

viscosity (visc.): the Brookfield viscosity of the product mPas at 25° C.

The results are shown in the enclosed Table 1.

TABLE 1

| NO | RES | KAT | TMQ | AsN | SsSY | % ST | % AC | % NIT | d.m.c. | visc. | NOTE |
|---|---|---|---|---|---|---|---|---|---|---|---|
| 1 | *P19065 (1/0.3) | APS | GEL | 0.3 | 0.003 | 0.9 | 30.9 | 68.2 | 25.0 | — | precipitates totally |
| 2 | *P19065 (8/0.3) | APS | GEL | 0.3 | 0.031 | 8.0 | 28.7 | 63.3 | 25.0 | — | precipitates |
| 3 | *P19065 (21/0.3) | APS | GEL | 0.3 | 0.093 | 20.6 | 24.7 | 54.6 | 21.9 | 2200 | viscous, no precipitate |
| 4 | *P19065 (1/1.0) | APS | GEL | 1.0 | 0.003 | 0.8 | 57.1 | 42.1 | 25.0 | — | precipitate to some extent |
| 5 | *P19065 (4/1.0) | APS | GEL | 1.0 | 0.015 | 3.8 | 55.4 | 40.8 | 25.2 | 27 | precipitate to a very limited extent |
| 6 | *P19065 (7/1.0) | APS | GEL | 1.0 | 0.031 | 7.4 | 53.3 | 39.3 | 26.6 | 30 | no precipitate |
| 7 | *P19065 (14/1.0) | APS | GEL | 1.0 | 0.062 | 13.8 | 49.7 | 36.6 | 25.8 | 128 | — |
| 8 | *P19065 (25/1.0) | APS | GEL | 1.0 | 0.123 | 24.2 | 43.6 | 32.1 | 26.1 | 1100 | viscous |
| 9 | *P19065 (1/1.4) | APS | GEL | 1.4 | 0.002 | 0.6 | 65.1 | 34.2 | 26.3 | 100000 | precipitate separates, pH changed → solids content viscosity |
| 10 | *P19065 (5/1.4) | APS | GEL | 1.4 | 0.021 | 5.0 | 62.3 | 32.7 | 25.4 | 48 | water phase separated, pH 1.93 |
| 11 | *P19065 (10/1.4) | APS | GEL | 1.4 | 0.042 | 9.5 | 59.3 | 31.2 | 26.4 | 99 | — |
| 12 | *P19065 (14/1.4) | APS | GEL | 1.4 | 0.062 | 13.6 | 56.6 | 29.8 | 27.3 | 124 | — |
| 13 | *P19065 (23/1.4) | APS | GEL | 1.4 | 0.115 | 22.6 | 50.7 | 26.7 | 26.4 | 12000 | — |
| 14 | *P19065 (37/1.4) | APS | GEL | 1.4 | 0.232 | 36.9 | 41.3 | 21.7 | 28.2 | 40000 | — |
| 15 | *P19065 (1/1.9) | APS | GEL | 1.9 | 0.002 | 0.5 | 71.7 | 7.8 | 0.0 | — | complete phase separation |
| 16 | *P19065 (5/1.9) | APS | GEL | 1.9 | 0.021 | 5.0 | 68.5 | 26.5 | 26.2 | 93 | — |
| 17 | *P19065 (10/1.9) | APS | GEL | 1.9 | 0.042 | 9.5 | 65.2 | 25.3 | 25.9 | 328 | — |
| 18 | *P19065 (19/1.9) | APS | GEL | 1.9 | 0.096 | 19.2 | 58.3 | 22.6 | 25.4 | 510 | no precipitate, pH 1.80 |
| 19 | *P19065 (32/1.9) | APS | GEL | 1.9 | 0.192 | 32.2 | 48.9 | 18.9 | 26.0 | 320 | — |
| 20 | *P19065 (1/2.6) | APS | GEL | 2.6 | 0.002 | 0.6 | 77.5 | 21.9 | 0.0 | — | complete phase separation |
| 21 | *P19065 (4/2.6) | APS | GEL | 2.6 | 0.017 | 4.0 | 74.8 | 21.2 | 26.9 | 5500 | partial phase separation, improved with turrax |
| 22 | *P19065 (8/2.6) | APS | GEL | 2.6 | 0.034 | 7.7 | 72.0 | 20.4 | 25.9 | 85 | — |
| 23 | *P19065 (16/2.6) | APS | GEL | 2.6 | 0.077 | 15.8 | 65.6 | 18.6 | 27.5 | 6000 | — |
| 24 | *P19065 (27/2.6) | APS | GEL | 2.6 | 0.155 | 27.3 | 56.7 | 16.0 | 26.7 | 1800 | — |
| 25 | *P19065 (1/3.3) | APS | GEL | 3.3 | 0.003 | 0.7 | 81.1 | 18.2 | 26.2 | 3500 | viscous, no precipitate |
| 26 | *P19065 (3/3.3) | APS | GEL | 3.3 | 0.014 | 3.3 | 79.0 | 17.6 | 27.3 | 100000 | separates, pH changed → solids content viscosity |
| 27 | *P19065 (8/3.3) | APS | GEL | 3.3 | 0.036 | 7.9 | 75.3 | 16.8 | 27.2 | — | viscosity varies within 3000–15000 cp |
| 28 | *P19065 (15/3.3) | APS | GEL | 3.3 | 0.072 | 14.7 | 69.8 | 15.6 | 25.3 | 840 | — |
| 29 | *P19065 (26/3.3) | APS | GEL | 3.3 | 0.144 | 25.6 | 60.8 | 13.6 | 26.1 | 66000 | — |
| 30 | *P19065 (1/0.3) | PER | GEL | 0.3 | 0.003 | 0.9 | 30.9 | 68.2 | 0.0 | — | complete phase separation, not analyzed |
| 31 | *P19065 (8/0.3) | PER | GEL | 0.3 | 0.031 | 8.0 | 28.7 | 63.3 | 0.0 | — | completely precipitated, does not dissolve in lye |
| 32 | *P19065 (21/0.3) | PER | GEL | 0.3 | 0.093 | 20.6 | 24.7 | 54.6 | 22.8 | 0 | ca. 15% of wet precipitate |
| 33 | *P19065 (30/0.3) | PER | GEL | 0.3 | 0.153 | 30.0 | 21.8 | 48.2 | 0.0 | 0 | thickened, when monomers had been fed |
| 34 | *P19065 (40/0.3) | PER | GEL | 0.3 | 0.238 | 40.0 | 18.7 | 41.3 | 26.5 | 25000 | colour: light brown/no precipitate |
| 35 | *P19065 (50/0.3) | PER | GEL | 0.3 | 0.356 | 50.0 | 15.6 | 34.4 | 25.7 | 100000 | colour: violet/no precipitate |
| 36 | *P19065 (1/1.0) | PER | GEL | 1.0 | 0.003 | 0.8 | 57.1 | 42.1 | 27.1 | 16 | precipitates, initially thickening when neutralized |
| 37 | *P19065 (4/1.0) | PER | GEL | 1.0 | 0.015 | 3.8 | 55.4 | 40.8 | 23.8 | 24 | — |
| 38 | *P19065 (7/1.0) | PER | GEL | 1.0 | 0.031 | 7.4 | 53.3 | 39.3 | 22.7 | 33 | — |
| 39 | *P19065 (14/1.0) | PER | GEL | 1.0 | 0.062 | 13.8 | 49.7 | 36.6 | 24.1 | 60 | — |
| 40 | *P19065 (24/1.0) | PER | GEL | 1.0 | 0.123 | 24.2 | 43.6 | 32.1 | 23.8 | 133 | rotated over a weekend at 25° C. |

TABLE 1-continued

| NO | RES | KAT | TMQ | AsN | SsSY | % ST | % AC | % NIT | d.m.c. | visc. | NOTE |
|---|---|---|---|---|---|---|---|---|---|---|---|
| 41 | *P19065 (41/1.0) | PER | GEL | 1.0 | 0.263 | 40.5 | 34.3 | 25.2 | 28.2 | 1280 | retrogrades |
| 42 | *P19065 (50/1.0) | PER | GEL | 1.0 | 0.386 | 50.0 | 28.8 | 21.2 | 26.2 | 800 | retrogrades |
| 43 | *P19065 (1/1.4) | PER | GEL | 1.4 | 0.002 | 0.6 | 65.1 | 34.2 | 31.6 | 7730 | separated, pH was adjusted to ca. 5 → visc., solids content |
| 44 | *P19065 (5/1.4) | PER | GEL | 1.4 | 0.021 | 5.0 | 62.3 | 32.7 | 26.1 | 35400 | separates when still, pH was adjusted to ca. 5, visc., solids content |
| 45 | *P19065 (10/1.4) | PER | GEL | 1.4 | 0.042 | 9.5 | 59.3 | 31.2 | 17.2 | 30 | — |
| 46 | *P19065 (14/1.4) | PER | GEL | 1.4 | 0.062 | 13.6 | 56.6 | 29.8 | 26.0 | 58 | — |
| 47 | *P19065 (23/1.4) | PER | GEL | 1.4 | 0.115 | 22.6 | 50.7 | 26.7 | 25.9 | 120 | — |
| 48 | *P19065 (37/1.4) | PER | GEL | 1.4 | 0.232 | 36.9 | 41.3 | 21.7 | 25.8 | 455 | — |
| 49 | *P19065 (1/1.9) | PER | GEL | 1.9 | 0.002 | 0.5 | 71.7 | 27.8 | 26.1 | 2340 | water separates, pH was adjusted to ca. 3.5 → measured viscosity |
| 50 | *P19065 (5/1.9) | PER | GEL | 1.9 | 0.021 | 5.0 | 68.5 | 26.5 | 26.8 | 49600 | water separates, treated with a 50% NaOH |
| 51 | *P19065 (10/1.9) | PER | GEL | 1.9 | 0.042 | 9.5 | 65.2 | 25.3 | 23.9 | 78 | separates into layers |
| 52 | *P19065 (19/1.9) | PER | GEL | 1.9 | 0.096 | 19.2 | 58.3 | 22.6 | 25.7 | 1060 | — |
| 53 | *P19065 (32/1.9) | PER | GEL | 1.9 | 0.192 | 32.2 | 48.9 | 18.9 | 28.1 | — | water separates, solids portion plastic-like |
| 54 | *P19065 (1/2.6) | PER | GEL | 2.6 | 0.002 | 0.6 | 77.5 | 21.9 | 27.4 | 137 | water separates, pH was adjusted to 3.5 → measured viscosity |
| 55 | *P19065 (4/2.6) | PER | GEL | 2.6 | 0.017 | 4.0 | 74.8 | 21.2 | 26.2 | 30000 | thick, sticky |
| 56 | *P19065 (8/2.6) | PER | GEL | 2.6 | 0.034 | 7.7 | 72.0 | 20.4 | 25.6 | 875 | — |
| 57 | *P19065 (16/2.6) | PER | GEL | 2.6 | 0.077 | 15.8 | 65.6 | 18.6 | 26.6 | 803 | — |
| 58 | *P19065 (27/2.6) | PER | GEL | 2.6 | 0.155 | 27.3 | 56.7 | 16.0 | 25.6 | 1870 | — |
| 59 | *P19065 (1/3.3) | PER | GEL | 3.3 | 0.003 | 0.7 | 81.1 | 18.2 | 27.0 | 600 | — |
| 60 | *P19065 (3/3.3) | PER | GEL | 3.3 | 0.014 | 3.3 | 79.0 | 17.6 | 25.3 | 232 | — |
| 61 | *P19065 (8/3.3) | PER | GEL | 3.3 | 0.036 | 7.9 | 75.3 | 16.8 | 25.8 | 350 | — |
| 62 | *P19065 (15/3.3) | PER | GEL | 3.3 | 0.072 | 14.7 | 69.8 | 15.6 | 25.6 | 880 | — |
| 63 | *P19065 (26/3.3) | PER | GEL | 3.3 | 0.144 | 25.6 | 60.8 | 13.6 | 25.2 | 1020 | — |
| 64 | *P19065 (50/0.3) | PER | GRA | 0.3 | 0.357 | 50.0 | 15.6 | 34.4 | 35.0 | — | granules do not cook |
| 65 | *P19065 (50/0.7) | PER | GRA | 0.7 | 0.376 | 50.0 | 24.4 | 25.6 | 35.0 | — | granules do not cook |
| 66 | *P19065 (50/1.0) | PER | GRA | 1.0 | 0.386 | 50.0 | 28.8 | 21.2 | 35.0 | — | difficult cooking |
| 67 | *P19065 (66/1.0) | PER | GRA | 1.0 | 0.748 | 66.0 | 19.6 | 14.4 | 35.0 | — | cook |

EXAMPLE 3

In this example, as a chain backbone polymer was used a native potato starch, which was split up by oxidizing it by hydrogen peroxide in the first step of the reaction. 75.12 g of native potato starch was elutriated in water and into this was added 4.2 g of a 35% hydrogen peroxide. The mixture was allowed to mix at a temperature of 40° C. for 2 hours, whereafter the temperature was increased to 97°–100° C. for gelatinizing the product for 2 hours. The reaction was then continued according to Example 1 at the reagent ratios of the example. As a product was obtained a white dispersion, whose solids content was 23.8%, viscosity 64.4 mPas and average particle size 870 nm. The pH-value of the product was 3.1 and the acrylonitrile residue was 90 ppm and the acrylic acid residue 0.1%.

EXAMPLE 4

A synthesis according to Example 1 was performed, in which 170 g of metacrylic acid (A/B molar ratio 1.0) was used in place of acrylic acid. As a product was obtained a white low-viscosity dispersion, whose acrylonitrile residue was 100 ppm.

EXAMPLE 5

A synthesis according to Example 1 was performed, in which 170 g of metacrylic acid and 168 g of vinyl acetate (A/B molar ratio=1) were used in place of acrylic acid. The total amount of water used for elutriating the starch and for diluting the peroxide was 1475 g. As a product was obtained a white low-viscosity dispersion.

EXAMPLE 6

A synthesis according to Example 1 was performed, in which the acrylic acid was replaced with 196 g of ethyl acrylate (A/B=1) and the total amount of water was 1730 g. As a reaction product was obtained a white dispersion, whose viscosity was 350 mPas.

EXAMPLE 7

In this example, the functionalility of a dispersion prepared according to the invention is compared as a coating-colour thickener with a commonly used carboxy methyl cellulose thickener, CMC Finnfix-10. The results listed in the following table are based on measurements, which have been performed from the following, by its composition typical LWC offset coating colour:

|  | Solids fractions |
|---|---|
| SPS kaolin | 100 |
| SB latex + thickener | 11 |
| Calcium stearate | 0, 5 |
| Solids content | 60% |
| pH | 7, 5 |

The reference is a colour, which contains no thickener. In addition, into the colour has been added 0.25–1.0 solids fractions of the thickener per 100 pigment fractions, and the Brookfield viscosity, water retention (Wat.r.) as well Haake viscosity have been measured at a shearing speed 10000 1/s (mPas). In the measurement has been used a water retention meter ÅAGWR developed by Åbo Akademi, which meter measures the drainage of water from the colour, when it is pressed at a certain pressure through a dense filter. The unit is $g/m^2$. The water retention of the colour is thus the higher, the lower the read-out is.

TABLE 2

| Sample | REF | FF-10 | FF-10 | FF-10 | FF-10 | 25/1.0 | 25/1.0 | 25/1.0 | 25/1.0 |
|---|---|---|---|---|---|---|---|---|---|
| Fract. | 0.0 | 0.25 | 0.5 | 0.75 | 1.0 | 0.25 | 0.5 | 0.75 | 1.0 |
| Visc. | 156.0 | 546.0 | 1040.0 | 1580.0 | 2200.0 | 1070.0 | 1560.0 | 2330.0 | 2680.0 |
| Wat.r. | 114.4 | 95.8 | 79.6 | 66.0 | 56.1 | 71.1 | 57.8 | 38.8 | 33.1 |
| Haake | 80.0 | 120.0 | 130.0 | 185.0 | 205.0 | 133.0 | 183.0 | 218.0 | 225.0 |

As it may be observed from the results of the table, the dispersion prepared according to Example 1 clearly causes a higher increase in the Brookfield viscoty level than carboxy methyl cellulose. At a high shearing speed, the viscosity level drops to a level corresponding to that of carboxy methyl cellulose. The inventive dispension provides for the colour a better water retention than that of carboxy methyl cellulose.

We claim:

1. A method for adjusting the rheological properties of an aqueous based, mineral pigment-containing, color coating composition for coating paper, which comprises: mixing the color coating composition with a solution or dispersion of a polymer prepared by graft-polymerizing onto a degraded starch having a viscosity of 10–200 mPas measured as a 10% water solution at 25° C., at least one $\alpha$-, $\beta$-unsaturated carboxylic acid having 3–8 carbon atoms and at least one monomer having a solubility in water of less than 20 grams per 100 grams of solution, the ratio of the carboxylic acid to the at least one monomer being in the range 0.2 to 4.0; said solution or dispersion having a pH value of 1.8–5; and wherein prior to mixing, the pH of the color coating composition was higher than that of the solution or dispersion.

2. A method according to claim 1, wherein the solution or dispersion of the polymer contains 0.1 to 2.0 parts of solids per 100 parts of the mineral pigment contained in the color coating composition.

3. A method according to claim 1, wherein the $\alpha$-, $\beta$-unsaturated acid is acrylic acid, methacrylic acid or a mixture thereof.

4. A method according to claim 1, wherein at least one monomer is acrylonitrile, vinyl acetate, methyl methacrylate, ethyl or methyl acrylate, or mixtures thereof.

5. A method according to claim 1, wherein the solution or dispersion contains 10 to 70% by weight of the polymer.

* * * * *